United States Patent
Paratore et al.

(10) Patent No.: US 6,294,997 B1
(45) Date of Patent: Sep. 25, 2001

(54) RFID TAG HAVING TIMING AND ENVIRONMENT MODULES

(75) Inventors: Robert M. Paratore, Woodinville; Paul A. Maltseff, Edmonds, both of WA (US)

(73) Assignee: Intermec Ip Corp., Woodland Hills, CA (US)

( * ) Notice: Subject to any disclaimer, the term of this patent is extended or adjusted under 35 U.S.C. 154(b) by 0 days.

(21) Appl. No.: 09/412,091

(22) Filed: Oct. 4, 1999

(51) Int. Cl.[7] .................................................. G08B 13/14
(52) U.S. Cl. ............................. 340/572.1; 340/309.15; 340/10.1; 340/457; 340/457.4; 340/540; 235/385
(58) Field of Search .................. 340/309.15, 10.1, 340/10.33, 457, 457.4, 540; 342/52, 50; 455/66; 705/28; 235/383, 385

(56) References Cited

U.S. PATENT DOCUMENTS

| | | | |
|---|---|---|---|
| 5,229,751 | * | 7/1993 | Chandler et al. ............... 340/618 |
| 5,241,299 | * | 8/1993 | Appalucci et al. ............ 340/572.3 |
| 5,530,702 | * | 6/1996 | Palmer et al. .................. 370/445 |
| 5,583,819 | * | 12/1996 | Roesner et al. ............... 340/10.51 |
| 5,798,694 | * | 8/1998 | Reber et al. ..................... 340/540 |
| 5,822,683 | * | 10/1998 | Paschen ............................ 455/66 |
| 5,883,582 | * | 3/1999 | Bowers et al. ................. 340/10.1 |
| 5,942,977 | * | 8/1999 | Palmer et al. ................ 340/572.5 |
| 6,062,126 | * | 5/2000 | Johnson et al. .................... 99/285 |
| 6,087,930 | * | 7/2000 | Kulka et al. .................... 340/447 |
| 6,130,602 | * | 10/2000 | O'Toole et al. ............... 340/10.33 |
| 6,148,271 | * | 11/2000 | Marinelli ........................ 702/141 |
| 6,148,291 | * | 11/2000 | Radican ............................ 705/28 |

OTHER PUBLICATIONS

"A Low–Power CMOS Integrated Circuit for Field–Powered Radio Frequency Identification Tags" By D. Friedman, H. Heinrich, D–W. Duan IBM Thomas J. Watson Research Center, Yorktown Heights, NY, 1997 IEEE International Solid–State Circuits Conference, Feb. 8, 1997 pp. 294–295, 474.

"Multifunction Credit Card Package" IBM Technical Disclosure Bullentin, vol. 38, No. 08, Aug. 1995, page 17.

* cited by examiner

Primary Examiner—Benjamin C. Lee
(74) Attorney, Agent, or Firm—O'Melveny & Myers LLP

(57) ABSTRACT

An RFID tag is provided with a timing module to measure elapsed time and an environment module to detect certain environmental conditions. The RFID tag includes a transmitter/receiver, memory module, antenna module, converter, and the timing and environment modules. In an embodiment of the invention, the timing module enables the user, upon interrogating the RFID tag, to determine the precise length of time from the previous charge of the RFID tag. The environment module enables the user to determine how long the RFID tag has been exposed to certain environmental conditions that have been pre-defined by the user.

23 Claims, 2 Drawing Sheets

RFID TAG HAVING TIMING AND ENVIRONMENT MODULES

BACKGROUND OF THE INVENTION

1. Field of the Invention

The present invention relates to radio frequency identification ("RFID") tags, and more particularly, to an RFID tag that can measure time and detect environmental changes.

2. Description of Related Art

In the automatic identification industry, the use of RFID tags has grown in prominence as a way to track data regarding an object to which the RFID tag is affixed. An RFID tag generally includes a semiconductor memory in which digital information may be stored, such as an electrically erasable, programmable read-only memory (EEPROMs) or similar electronic device. Under a technique referred to as "backscatter modulation," the RFID tags transmit stored data by reflecting varying amounts of an electromagnetic field provided by an RFID interrogator by modifying their antenna matching impedances. The RFID tags can therefore operate independent of the frequency of the energizing field, and as a result, the interrogator may operate at multiple frequencies so as to avoid radio frequency (RF) interference, such as utilizing frequency hopping spread spectrum modulation techniques. The RFID tags may either be passive, in which they extract their power from the electromagnetic field provided by the interrogator, or active, in which they include their own power source.

One of the many advantages of RFID tags is that they can be manufactured in very small, light weight and inexpensive units. Passive RFID tags are particularly cost effective since they lack a power source. In view of these advantages, RFID tags can be used in many types of applications in which it is desirable to track information regarding a moving or inaccessible object. One such application is to affix RFID tags to work pieces moving along a conveyor belt of an assembly line. The RFID tags would contain stored information regarding the particular assembly requirements for the work piece to enable automated equipment to operate on the work piece and perform certain tasks unique to the work piece requirements. This way, products having different assembly requirements can be sent down the same assembly line without having to modify the assembly line for each unique requirement. Another application for RFID systems is to collect information from a moving motor vehicle, such as for vehicle toll collection.

A drawback of conventional RFID tags is that they are not able to measure a given length of time, or more specifically, to measure the time that the RFID tag is exposed to a given environmental condition. This ability would be very desirable for RFID tags attached to items that are sensitive to time and environment, such as perishable foods. A time-tracking feature would enable the seller to determine the precise age of the goods they are selling. This would be beneficial to both the seller, who could maximize his profit, and the consumer, who would be given accurate information regarding the food being bought. Moreover, an RFID tag that can detect and report on environment conditions would be further beneficial in the perishable food applications because conditions such as an unacceptably high or low temperature, humidity, or pressure, as well as exposure to certain undesirable gasses could be monitored to determine the food's freshness. Timing and environmental tracking features would also be beneficial for many other applications including the parcel delivery business where certain items to be shipped could be sensitive to time or environment.

It is therefore an object of the present invention to provide an RFID tag with timing capabilities. It is a further object of the present invention to provide an RFID tag with an environment module to detect certain environmental conditions and measure the length of time that an RFID tag is exposed to the environmental conditions.

SUMMARY OF THE INVENTION

In accordance with the present invention, an RFID tag with timing and environment modules is provided. The RFID tag includes a transmitter/receiver, memory module, antenna module, converter and a timing and environment module. The timing module enables the user, upon interrogating the RFID tag, to determine the precise length of time from the previous charge of the RFID tag. The environment module enables the user to determine how long the RFID tag has been exposed to certain conditions that have been pre-programmed into the RFID tag. These features greatly enhance standard RFID tags because they broaden the range of uses for RFID tags.

In an embodiment of the invention, a timing module is incorporated into a passive RFID tag to keep track of the length of time from previous charge. The timing module may include a resistor coupled to a charging capacitor. The capacitor is initially charged, but over time the charge dissipates from the capacitor. When the RFID tag is subsequently read, the amount of capacitance leak can be determined, and the time can be calculated based on the rate of dissipation. The dissipation rate can be controlled through the use of different valued resistors. For instance, a high value resistor will promote a slow leak while a small value resistor will promote a faster leak. The size of the resistance used in the timing module depends on the application. The time from charging is determined by knowing the value of the resistor and the amount of charge left in the capacitor. A register is located within the timing module and records a number of ticks (i.e., units of time) based on the dissipation of the charge. The value of each tick can be set to correspond with a predetermined time period, e.g., one second, one hour, one week, one year, etc., depending on the particular application. Upon interrogation of the RFID tag, the data from the register is sent to the interrogator so that elapsed time from the last charging can be ascertained.

In another embodiment of the invention, the timing module is combined into a passive RFID tag with an environment module in order to provide a way to ascertain the amount of time that the RFID tag has been exposed to adverse environmental conditions. A micro-sensor may be provided to detect a certain environmental condition and perform a particular function upon the passing of a predetermined threshold. For example, the micro-sensor may be adapted to detect temperature. The detected temperature is then compared against a predetermined threshold value, and when the detected temperature rises above the threshold, the micro-sensor would initialize a timer. The timer would track the number of ticks until the temperature returned to a normal range, in which case the timer would stop. The count of ticks would enable the user to know exactly how long the RFID tag was exposed to the elevated temperature. Alternatively, the micro-sensor may be adapted to react chemically with a substance in the environment, and changes in electrical conductivity of the micro-sensor may be used to determine the length of time that the RFID tag, and the item it is attached to, has been exposed to a certain condition. The micro-sensor may also be sensitive to pressure, and when a certain pressure is exceeded, the micro-sensor will undergo a chemical transformation. Based on the state of the micro-sensor, measured by electrical conductivity upon interrogation, the length of time that the RFID tag was exposed to the elevated pressure can be readily calculated.

A more complete understanding of the RFID tag having a timing and environment module will be afforded to those skilled in the art, as well as a realization of additional advantages and objects thereof, by a consideration of the following detailed description of the preferred embodiment. Reference will be made to the appended sheets of drawings that will first be described briefly.

DESCRIPTION OF THE PREFERRED EMBODIMENT

The present invention satisfies the need for an RFID tag having the capability to provide data related to time and environmental conditions. In the present invention, the RFID tag is provided with a timing module that detects elapsed time and an environment module that monitors certain environmental conditions. In the detailed description that follows, like element numerals are used to describe like elements shown in one or more of the figures.

Figure 1:
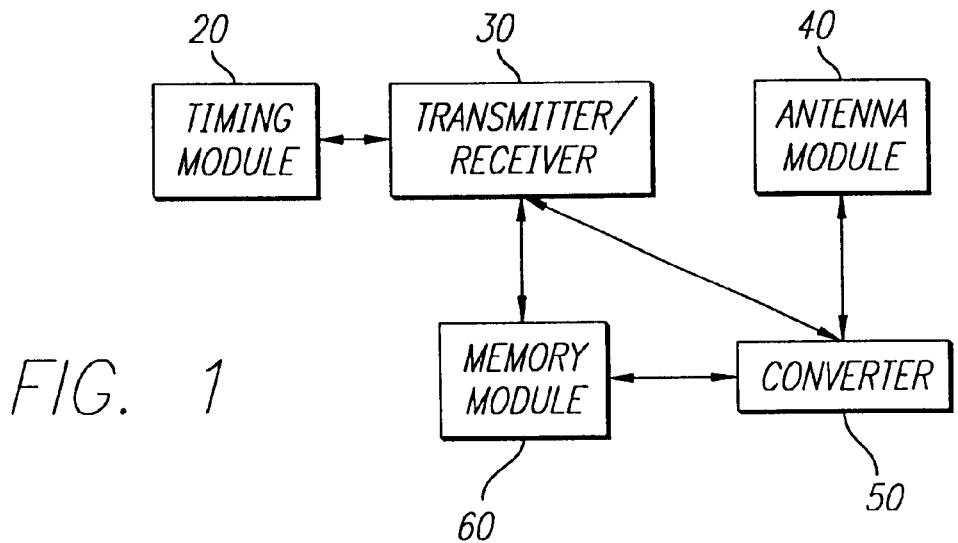
FIG. 1 is a block diagram of an RFID tag having a timing module.

Referring now to FIG. 1, an RFID tag 10 is illustrated in block diagram form. The RFID tag 10 includes a timing module 20, a transmitter/receiver module 30, and antenna module 40, a data converter 50, and a memory 60. It should be appreciated that one or more of the modules that comprise the RFID tag 10 may be implemented in a single integrated circuit that further includes a processor or processing logic. The transmitter/receiver module 30 controls the communication of data to and from an external interrogator via the antenna module 40. The memory module 60 serves many functions including data recovery, operating protocols and user-available data storage. The memory module 60 may include read-only memory (ROM), random access memory (RAM), and non-volatile programmable memory for data storage. The ROM memory is used to accommodate security data and the RFID tag operating system instructions which, in conjunction with the processor or processing logic performs the internal "house-keeping" functions such as response delay timing, data flow control and power supply switching. The RAM memory is used to facilitate temporary data storage during RFID tag interrogation and response. The non-volatile memory, such as flash memory, is used to store the RFID tag data and retains data when the RFID tag is in a quiescent or power-saving "sleep" state. The memory module 60 may further include data buffers to temporarily hold incoming data following demodulation and outgoing data for modulation. The RFID tag 10 may further include interface circuitry to direct and accommodate the interrogation field energy for powering purposes and triggering of the RFID tag response. The data converter 50 changes various types of signals including converting received electrical signals from analog to digital form, and transmitted electrical signals from digital to analog form.

The timing module 20 is used to calculate elapsed time. Generally, the timing module 20 may include a resistor or group of resistors coupled to a capacitor, which acts as the main source of power for the RFID tag 10. The resistor(s) coupled to the capacitor determines the amount of current leak from the capacitor after the capacitor has been fully charged. As known in the art, a resistor having a relatively low resistance value will allow a higher rate of dissipation than a resistor having a higher resistance value. The resistance value may be selected based on the complexity of the RFID tag 10 and for the intended applications of the RFID tag. By knowing the resistance value, the elapsed time can be readily calculated by determining the amount of charge remaining in the capacitor. Another way of calculating the time is by using a register, which can be included in either the timing module 20 or the transmitter/receiver 30, and counting the number of ticks (i.e., units of time) in the register when retrieving data from the RFID tag 10. Each tick can be adapted to correspond with a predetermined unit of time, e.g., seconds, minutes, hours, etc. Upon interrogation of the RFID tag, data corresponding to number of ticks is retrieved from the register or registers in the RFID tag 10 and transmitted to the interrogator.

The arrows in FIG. 1 illustrate interactions between the different components of the RFID tag 10. Digital signals received from the antenna module 40 from the external interrogator are sent to the converter 50 where they are transformed, if necessary, or are sent directly to the transmitter/receiver 30. The memory module 60 interacts with both the converter 50 and the transmitter/receiver 30, performing functions as described above. The timing module 20 communicates with the transmitter/receiver 30 so that upon interrogation, the timing data can be conveyed to the interrogator.

Figure 2:
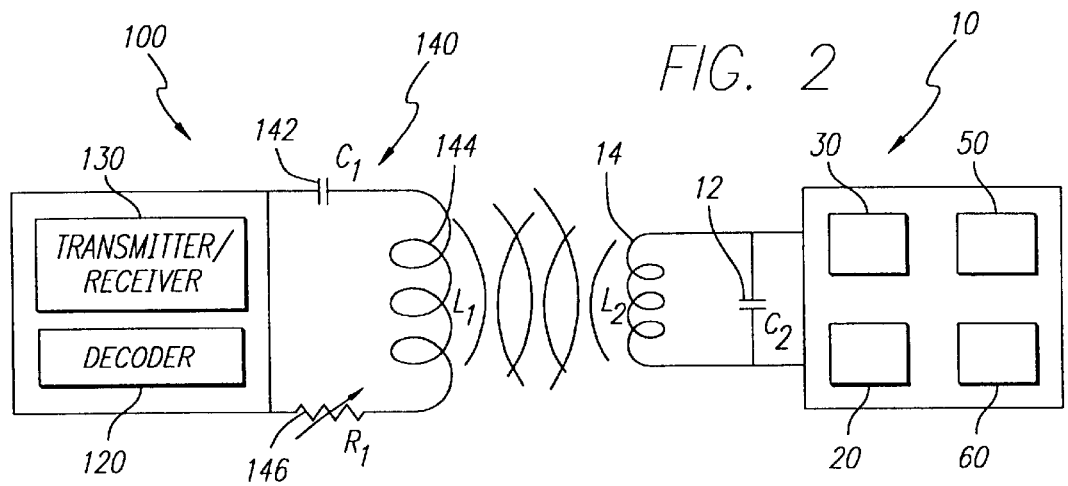
FIG. 2 illustrates an RFID tag communicating with an RFID interrogator.

Referring now to FIG. 2, an RFID tag 10 is illustrated in communication with an RFID interrogator 100. The RFID interrogator 100 includes a decoder 120, a transmitter/receiver 130 and an antenna circuit 140 that emits electromagnetic waves that are used to provide an interrogating field to the RFID tag 10. The antenna circuit 140 comprises an inductor 144 ($L_1$), a capacitor 142 ($C_1$), and a resistor 146 ($R_1$). The resistor 146 may further comprise a variable resistor. The RFID tag 10 further comprises an inductor 14 ($L_2$) and a capacitor 12 ($C_2$). The interrogating field provided by the RFID interrogator 100 induces a current in the inductor 14 which charges the capacitor 12 that is used to provide power the RFID tag 10. After being powered up, the RFID tag 10 transmits data from its non-volatile memory in the memory module 60 to the RFID interrogator 100.

Figure 3:
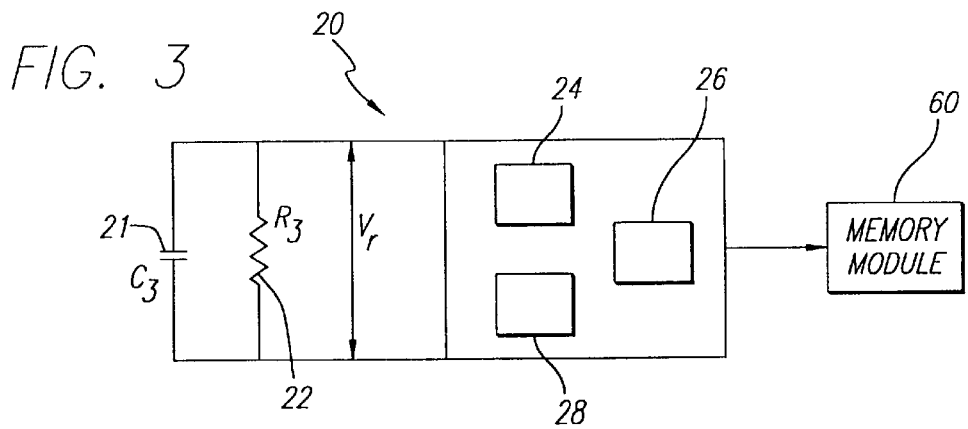
FIG. 3 is a block diagram of an embodiment of the timing module of the RFID tag.

FIG. 3 shows an embodiment of the timing module 20 in greater detail. The timing module 20 includes a capacitor 21 ($C_3$), a resistor 22 ($R_3$), an A/D converter 24, a control circuit 26, and an N-bit register 28. The timing module is illustrated in communication with the memory module 60 of the RFID tag. Once powered by the RFID interrogator 100, the control circuit 26 causes the capacitor 21 to become charged. If the initial charge voltage across the capacitor 21 is $V_0$, then the residual voltage $V_r$ will be as follows:

$$V_r = V_0 e^{-t/RC}$$

where t is time (seconds), R is the resistance value of resistor 22 ($R_3$) (ohms), and C is the capacitance value of capacitor 21 ($C_3$) (farads). Conversely, if the value of the residual voltage $V_r$ is known, then the time t elapsed from the initial charge of capacitor 21 is equal to:

$$t=(RC)(\log(V_0/V_r))$$

The value of the residual voltage $V_r$ is converted to a digital value by the A/D converter 24 and stored in the N-bit register 28. This digitized voltage value is then communicated to an interrogator 100 (see FIG. 2) together with data stored in the memory module 60.

Figure 4:
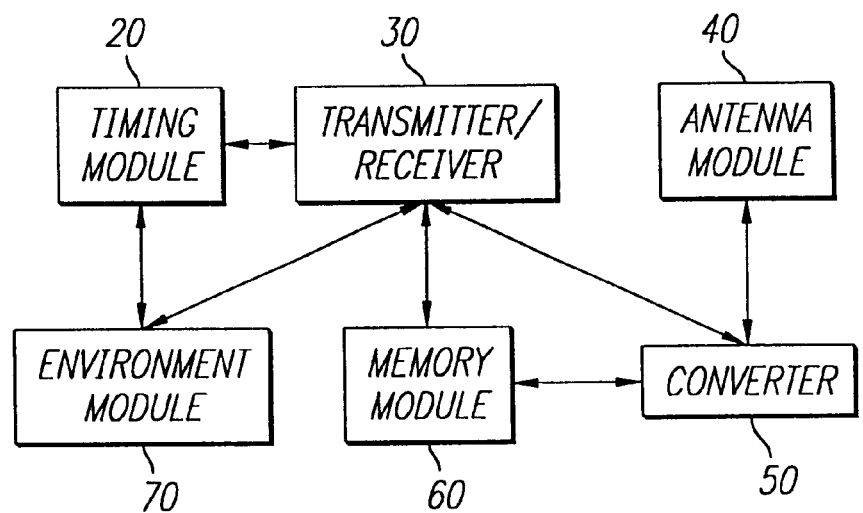
FIG. 4 is a block diagram of an RFID tag having both timing and environment modules.

FIG. 4 adds an environment module 70 to the embodiment shown in FIG. 1. When used in connection with the environment module 70, the timing module 20 performs a slightly different function than described above. Instead of merely tracking time from a previous charging, the timing module 20 tracks the amount of time that the RFID tag has been exposed to certain environmental conditions, such as temperature, pressure and/or humidity. This function is very useful for tracking and identifying environment-sensitive goods, such as perishable food items. The environment module 70 can have several different embodiments. In a first embodiment, the timing module 20 can function as an environment module in certain circumstances by measuring variations in conductivity in the resistor 22 of timing module 20 (described above). Since, for example, an increase in temperature translates to an increase in conductivity in the resistor 22, the time that the RFID tag has been subjected to the elevated temperature can be discerned by measuring the duration of the increase in conductivity. In the same manner, a decrease in temperature corresponding to a decrease in conductivity in the resistor 22 could also be measured.

A second embodiment of the environment module utilizes a micro-sensor to detect changes in specified conditions. The micro-sensor can be set to evaluate any relevant environmental condition that exceeds a certain threshold. For example, if it is desired to measure the length of time that an item is subjected to an increase in temperature (which may adversely affect the item, such as a perishable good), the micro-sensor could be set to activate once the pre-specified temperature is attained. By coupling the micro-sensor to the timing module 20, the length of time that the RFID tag is at the increased temperature can be calculated. This can be done in one of two ways. First, the activation of the micro-sensor could trigger a register to begin to record time ticks until the micro-sensor was de-activated (i.e. the environmental condition was within an acceptable range). When the RFID tag is read by an interrogator, the total time ticks logged in the register would correspond to the total amount of time that the item was exposed to the condition. Alternatively, the micro-sensor can trigger a break in a conductive circuit in response to an undesirable environmental condition, such as the presence of a potentially harmful gas like carbon monoxide. Thus, if the micro-sensor is set for a certain level of carbon monoxide, upon reaching that level a break in the circuit would be formed. Subsequently, if the concentration of carbon monoxide returns to an acceptable range, the circuit would be re-established. Upon interrogation of the RFID tag, the length of time that the RFID tag was subjected to the predetermined level of carbon monoxide gas can be ascertained.

Figure 5:
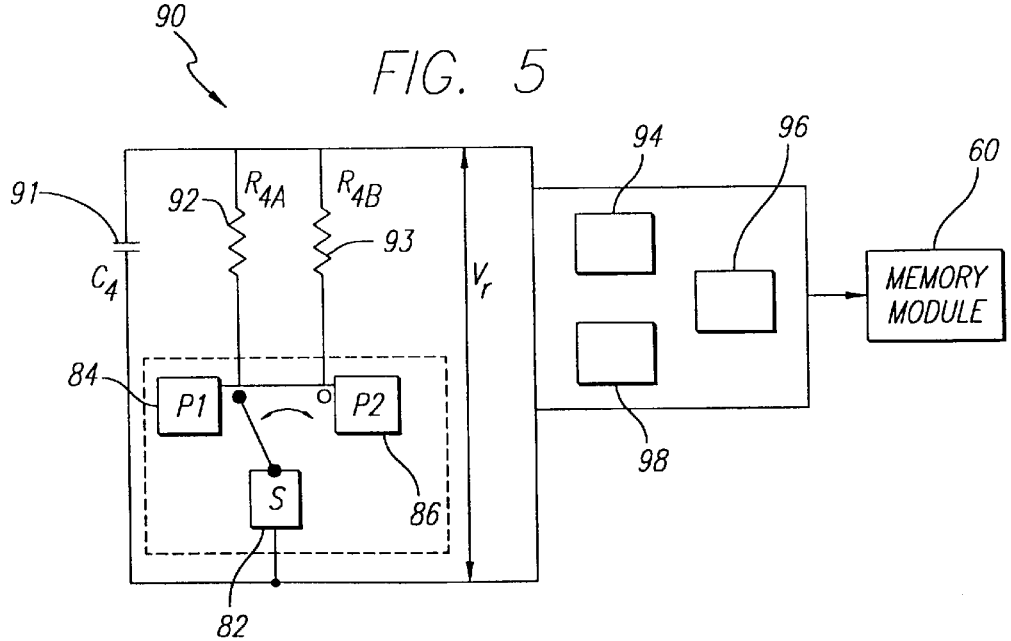
FIG. 5 is a block diagram of an embodiment of the environment module of the RFID tag.

FIG. 5 shows a third embodiment of the invention in which an environment module 80 is integrated with a timing module 90. The timing module 90 includes a A/D converter 94, a control circuit 96 and an N-bit register 98. The environment module 80 includes a switch 82 having contact points 84, 86. Each respective contact point 84, 86 is coupled to a resistor 92, 93. The timing module 90 includes a capacitor 91 ($C_4$) that is charged in the same manner as capacitor 21 of FIG. 3. When the specific environmental condition, such as an elevated temperature, is less than a threshold value Q, the switch 82 is toggled to the first contact point 84 coupling resistor 92 across the capacitor 91. When the threshold value Q is crossed, the switch 82 toggles to the second contact point 86 coupling resistor 93 across the capacitor 91. By altering positions based on the environmental conditions encountered, the switch 82 controls the rate in which the capacitor 91 discharges. Thus, if the initial charge is $V_0$, then the residual voltage $V_r$ after t seconds will be as follows:

$$V_r=(V_0)(e^{-t/R'C})(e^{-t/R''C})$$

where t is time (seconds), R' is the resistance value of resistor 92 ($R_{4A}$) (ohms), R" is the resistance value of resistor 93 ($R_{4B}$), and C is the capacitance value of capacitor 91 ($C_4$) (farads). If the value of $R_{4A}$ is significantly larger than $R_{4B}$, then the total time t that the switch 82 is locked into the second position 86 is given by:

$$t=(R_{4B}C)(\log(V_0/V_r))$$

Thus, the time t will indicate the amount of time that RFID tag 10 is exposed to a certain environmental condition (in this example an elevated temperature).

An alternate method of determining the length of time that an RFID tag is exposed to a certain environmental condition is through the chemical transformation of a substance. For one-time use RFID tags, metallic micro-particles are suspended in a polymer and incorporated into the RFID tag. The type of polymer chosen depends on the environmental conditions that are intended to be measured. For instance, if it is desired to measure the time that an RFID tag is exposed to a heightened temperature, a polymer that would evaporate at that temperature may be chosen. Thus, upon reaching the pre-set temperature, as the polymer evaporates, the metallic micro-particles get closer together, forming a tiny conductive circuit. The chemical transformation increases the conductivity of the substance because the more polymer that is present in the compound, the lower the conductivity of that compound. When the RFID tag is subsequently interrogated, the conductivity can be measured, revealing the amount of time that the item was at the specified temperature. This calculation is made possible due to the relatively constant rate of evaporation of the polymer at the specified temperature. It should be appreciated by those skilled in the art that a similar compound could be formulated to respond to pressure, humidity and other conditions in addition to temperature.

In operation the RFID tag having the timing and environment modules described above would be affixed to a perishable or degradable good in order to provide users with information regarding the status of the good. For example, food products typically have a limited shelf life that can be prematurely shortened by exposure to certain environmental conditions, such as excess temperatures. When the particular food product is packaged, such as when a refrigerated meat product is wrapped for sale, an RFID tag may be affixed to the packaging having the expiration date of the product programmed in the memory therein. The timing module will track the passing of time in the manner described above. If the product is exposed to temperatures that exceed a predetermined value, the environment module will cause the timing module to track the passing of time at an accelerated rate during the time of the excess temperature exposure, as also described above. The RFID tag can be interrogated periodically, such as by the employees of the retail establishment, or by the consumer at the point of purchase. The RFID tag data will thereby show whether the shelf life of the product has expired, either due to the normal passage of time or due to the accelerated passage of time in view of exposure to excess temperature.

Numerous other types of goods have expiration dates that can be monitored in a similar manner. For example, goods such as photographic film, pharmaceuticals, paints, and disposable batteries all have an expiration date and can be adversely affected by exposure to certain environmental conditions. Disposable batteries have an additional characteristic in that they must be fully charged before shipment for retail sale. The charge state of the batteries tends to degrade over time while in storage awaiting shipment. To ensure that the batteries are fully charged, it is typical for all batteries to be charged just prior to shipment, whether or not they are already in a fully charged state. Batteries that have discharged beyond a certain point may not be irreversibly damaged and are thus disposed of. The RFID tag of the present invention can be configured to track and store the time since the last charging cycle of a battery, and can also monitor exposure of the battery to adverse environmental conditions. The battery manufacturer can then use the information to selectively charge ones of the batteries requiring recharge, dispose of batteries that have exceeded the shelf life, and skip recharging of batteries that are still fresh. Such a system would present a substantial cost and time savings to such manufacturers.

Having thus described a preferred embodiment of an RFID tag having timing and environment modules, it should be apparent to those skilled in the art that certain advantages of the within described system have been achieved. It should also be appreciated that various modifications, adaptations, and alternative embodiments thereof may be made within the scope and spirit of the present invention. For example, while the timing and environment modules have been illustrated as incorporated into standard, passive RFID tags, it should be apparent that the inventive concepts described above would be equally applicable to more complex RFID tags, including active RFID tags. The invention is further defined by the following claims.

What is claimed is:

1. An RFID tag comprising:
   a memory having a data storage area;
   a transmitter/receiver coupled to said memory for communicating data between said memory and an external interrogator; and
   timing means for tracking elapsed time from a predefined initial condition of said RFID tag, wherein data corresponding to said elapsed time is communicated to said external interrogator.

2. The RFID tag according to claim 1, wherein said timing means further comprises a capacitor charged to an initial voltage level, said elapsed time being determined from a measurement of discharge of said capacitor over time.

3. The RFID tag according to claim 2, further comprising a resistor coupled in parallel with said capacitor, wherein a resistance value of said resistor corresponds to a rate of discharge of said capacitor.

4. The RFID tag according to claim 1, wherein said timing means further comprises a register storing said data in pre-defined units of time.

5. The RFID tag according to claim 1, further comprising environment means for detecting changes in environmental conditions.

6. The RFID tag according to claim 5, wherein said environment means is operative in cooperation with said timing means to determine an amount of time in which a particular environmental condition is present.

7. The RFID tag according to claim 5, wherein said environment means comprises a micro-sensor responsive to a particular environmental condition.

8. The RFID tag according to claim 5, wherein said environment means comprises a metallic micro-particle suspended in a polymer.

9. The RFID tag according to claim 5, wherein said environmental conditions include at least one of temperature, pressure, humidity, and exposure to a known chemical.

10. The RFID tag according to claim 5, wherein said environment means further comprises a resistor having a resistance value that varies in accordance with changes in temperature.

11. A method for operating an RFID tag, comprising the steps of:
    measuring an amount of elapsed time from an initial state of said RFID tag; and
    reporting the measured elapsed time to an external interrogator in communication with said RFID tag.

12. The method according to claim 11, further comprising the steps of:
    detecting an exposure of said RFID tag to predefined environmental condition; and
    determining a length of time of said exposure to said predefined environmental condition.

13. The method according to claim 12, wherein said reporting step further comprises reporting the determined length of time to said external interrogator in communication with said RFID tag.

14. The method according to claim 12, wherein said detecting step further comprises detecting an amount of evaporation of a selected polymer.

15. The method according to claim 14, further comprising the step of selecting said polymer based on its property to evaporate in presence of said predefined environmental condition.

16. The method according to claim 12, wherein said measuring step further comprises activating a timer upon passing of a threshold level of said predefined environmental condition into an unacceptable state.

17. The method according to claim 16, wherein said measuring step further comprises deactivating said timer when said predetermined environmental condition returns to an acceptable state.

18. The method according to claim 11, wherein said measuring step further comprises the steps of:
    charging a capacitor to an initial charge level;
    discharging said capacitor at a known rate; and
    determining the present level of charge of said capacitor, wherein said elapsed time corresponds to said present level of charge.

19. A method for monitoring the freshness of a good, comprising the steps of:
    affixing an RFID tag to said good, said RFID tag being adapted to detect an amount of elapsed time from an initial condition of said good;
    interrogating said RFID tag to determine the measured elapsed time therefrom; and
    determining a freshness state of said good based on said determined elapsed time.

20. The method according to claim 19, wherein said good further comprises an expiration date, and the method further comprises the step of determining whether the expiration date has expired.

21. The method according to claim 20, wherein said RFID tag is further adapted to detect exposure to predefined environmental conditions, and the method further comprises the step of determining a length of time of said exposure to said predefined environmental condition.

22. The method according to claim 21, further comprising the step of effectively reducing time until expiration of said expiration date upon detection by said RFID tag of said predefined environmental conditions.

23. The method according to claim 21, wherein at least one of said predefined environmental conditions comprises temperature above a certain threshold.

* * * * *